UNITED STATES PATENT OFFICE.

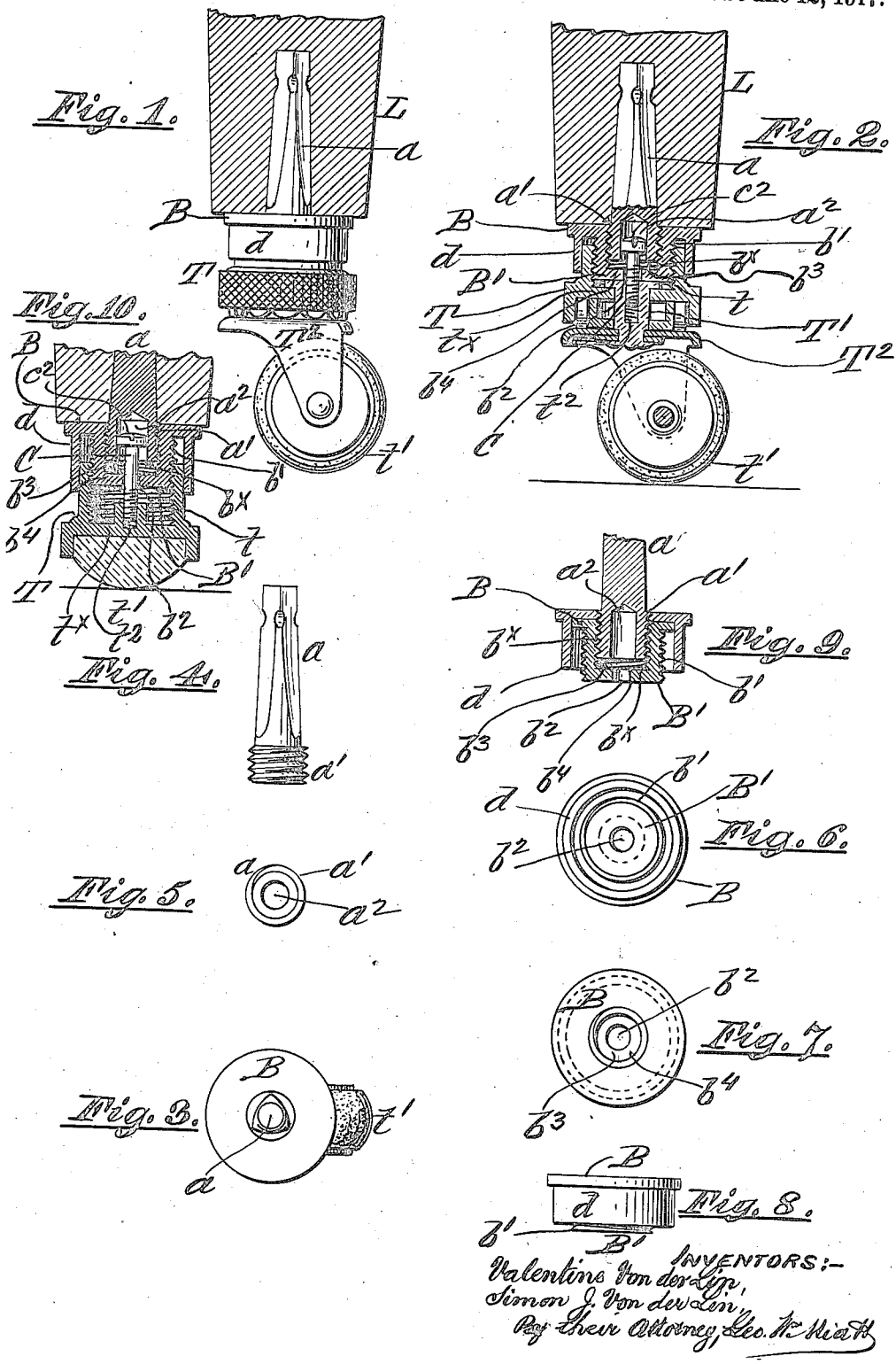
V. & S. J. VON DER LIN.
FURNITURE TREAD.
APPLICATION FILED NOV. 7, 1916.
1,229,831.
Patented June 12, 1917.

VALENTINE VON DER LIN AND SIMON J. VON DER LIN, OF NEW YORK, N. Y.

FURNITURE-TREAD.

1,229,831.  Specification of Letters Patent.  Patented June 12, 1917.

Application filed November 7, 1916. Serial No. 129,920.

*To all whom it may concern:*

Be it known that we, VALENTINE VON DER LIN and SIMON J. VON DER LIN, both citizens of the United States, residing in the borough of Manhattan, city, county, and State of New York, have invented certain new and useful Improvements in Furniture-Treads, of which the following is a specification.

Our improvements relate to the type of furniture tread set forth in Letters Patent of the United States No. 1,173,990, issued to us Feb. 29, 1916, and designed to afford a simple, cheap and effective adjustable tread for application to the legs or supports of tables or other articles of furniture whereby variations in length of support or inequalities of floor surface may be conveniently and expeditiously compensated for; our present invention relating particularly to the "self-contained" means of connection between tread and supporting post set forth in our concurrent application No. 120,595, filed Sept. 18, 1916, and being designed to adapt such means of connection to a caster tread as well as to the inverted-dome-shaped tread of said patent and said concurrent application.

The invention consists in the specific construction and arrangement of parts described and claimed herein, distinctive features being the use of a recessed stud by which the screw post of the adjustable tread is attached to the furniture,—the recess in said attachment-stud accommodating the head and upper part of the coupling pin which limits the extent of adjustment of the tread on said screw post; and in the use of an annular dust guard flange which incloses the upper edge of the tread member, conceals and protects the screw post, etc., all as hereinafter fully set forth.

In the accompanying drawings,

Figure 1, is an elevation of a tread of the caster type mounted upon a furniture leg by our improved means of adjustment;

Fig. 2, is a central vertical elevation thereof;

Fig. 3, is a top view of the caster mount shown in Figs. 1, and 2;

Fig. 4, is a side elevation of the attachment-stud;

Fig. 5, is an elevation of the lower end thereof;

Fig. 6, is a view of the under side of the post member;

Fig. 7, is a view of the upper side thereof;

Fig. 8, is a side elevation thereof;

Fig. 9, is a central vertical section of the lower part of the attachment-stud, the post member and the dust guard, the latter being shown as a piece separate from the post member;

Fig. 10, is a sectional elevation similar to Fig. 2, showing the use of our improved means of adjustment in connection with a dome tread.

In adapting our device for effecting vertical adjustment to a tread of the caster type it is desirable to conform to the usual method of securing a caster tread in position for use by means of an attachment-stud, which is forced into a bore formed in the furniture leg or other support L.

For this reason we provide our hollow screw post $B'$, with an attachment-stud $a$, the lower end of which is formed with a peripheral screw thread $a'$, for engagement with a screw thread $b^x$, formed for its reception in said post member $B'$,—said lower extremity of the attachment-stud $a$, being also formed with an axial recess $a^2$, to accommodate the head $c^2$, and upper portion of the coupling pin C. B, is the base of the hollow post $B'$, the latter being formed with the peripheral thread $b'$, for engagement with the screw thread $t$, formed in the hollow cup-shaped member T, to the web $t^x$, (Fig. 2,) of which is secured the trunnion $T'$, upon which the caster bracket $T^2$, is pivotally mounted,—$t'$, representing the actual tread for contacting with the floor. In the form of caster tread shown in the drawings anti-friction rollers are interposed between the web $t^x$, and the top of the caster bracket $T^2$, but this is a mere detail of construction not pertinent to the present invention, the only novelty in this respect consisting in forming a screw thread $t^2$, in the trunnion $T'$, for the reception of the threaded end of the coupling pin C, as shown in Fig. 2. Thus the tread member T, and its supporting screw post B' are coupled together by the axially positioned coupling rod C, as in our concurrent application hereinbefore referred to,—the coupling member C, consisting preferably of a pin or stud which is screw-threaded as stated for engagement with the screw thread $t^2$, formed in the trunnion T', of the tread member T, while its upper extremity is formed with a head $c^2$, of greater diameter than the opening $b^2$, in the lower end of the hollow post B', through which the coupling rod C, protrudes. In other words, the lower extremity of the screw post B', is closed except for the opening $b^2$, of less diameter than the hollow interior $b^3$, of said post so as to form an annular retaining shoulder $b^4$, which, by contacting with the head $c^2$, of the coupling rod C, limits the degree of vertical adjustment in one direction of the tread member T, upon the screw post B', and at the same time connects them permanently, in that the tread member T, cannot be removed from its supporting screw post B', unless the coupling screw C, be first removed, and this obviously cannot be done while the attaching-stud $a$, is in engagement with said screw post B'.

By forming the head $c^2$, of the coupling pin C, with a nick or otherwise providing for its rotation, the lower end of the coupling pin C, may, in the absence of the attaching stud $a$, be readily screwed more or less into the trunnion $T^2$, thereby regulating the distance between said head $c^2$, and the shoulder $b^4$, at the bottom of the post B', and hence prescribing the extent of adjustment of the tread member T, on said supporting post B.

In order to conceal the peripheral thread $b'$, of the post B', and exclude dust and extraneous matter we provide said post B', with an annular dust guard flange $d$, which overlaps the upper edge of the tread member and may be formed directly on the base B, of said post, as in Figs. 2, and 10, or may be formed with its own base $d'$, as in Fig. 9. In either case it effectually isolates and protects the screw threads both from dust and moisture, and imparts a more finished and symmetrical external appearance, while reinforcing and strengthening the device against lateral strain in use.

By forming the recess $a^2$, in the lower end of the attachment-stud $a$, for the accommodation of the head $c^2$, and upper portion of the coupling pin C, we are enabled to effect a simple, compact arrangement of parts and lessen the height or length of the screw post B; and in like manner the screw-tapping of the upper end of the trunnion T', for the reception of the threaded end of the coupling pin C, also economizes space and adapts our means of tread adjustment to caster treads. In this connection it may be noted that the trunnion T', is essentially a part of the tread member T, being permanently secured thereto, so that the thread $t^2$, by engaging with the threaded end of the coupling screw C, performs the same function whether formed in the trunnion T', as in Fig. 2, or directly in the tread member T, as in Fig. 10.

In Fig. 10, we have shown our recessed attachment-stud $a$, and dust guard $d$, as used in connection with an inverted-dome tread, by which it will be seen that the principle is essentially the same for both forms of tread, either fixed or rotatable.

The screw threads $a'$, on the attaching-stud $a$, should be reversed in inclination to the engaging screw threads $b'$, $t$, on the post B', and tread member T, respectively.

What we claim as our invention and desire to secure by Letters Patent is,

1. Means for attaching and adjusting furniture treads as herein set forth, comprising an internally screw threaded tread member, a hollow peripherally threaded post on which said tread member is adjustable, said hollow post being formed with an inturned shoulder, an axially positioned coupling pin screwing into the tread member and extending upward into said hollow supporting post and provided with a retaining head opposed to said inturned retaining shoulder on the hollow post, and an attachment-stud screwing into said hollow post and formed with an axial recess to accommodate the retaining head and upper portion of said coupling pin.

2. Means for attaching and adjusting furniture treads as herein set forth, comprising an internally screw threaded tread member, a hollow peripherally threaded post on which said tread member is adjustable, said hollow post being formed with an inturned shoulder, an axially positioned coupling pin screwing into the tread member and extending upward into said hollow supporting post and provided with a retaining head opposed to said inturned retaining shoulder on the hollow post, an attachment-stud screwing into said hollow post and formed with an axial recess to accommodate the retaining head and upper portion of said coupling pin, and an annular dust-guard flange over-lapping the upper edge of the tread member, for the purpose described.

3. Means for attaching and adjusting furniture treads as herein set forth comprising an internally screw-threaded tread member, a caster pivotally mounted on a trunnion secured to said tread-member, said trunnion, a hollow peripherally threaded post on which said tread member is adjustable, said hollow post being formed with an inturned shoulder, an axially positioned coupling pin screwing into said caster trunnion and extending upward into said hollow supporting post and provided with a retaining head opposed to said inturned retaining shoulder on said hollow post, and an attachment-stud screwing into said hollow post and formed with an axial recess to accommodate the retaining head and upper portion of said coupling pin, for the purpose described.

VALENTINE von der LIN.
SIMON J. von der LIN.

Witnesses:
 FRANZ SIGEL, 2d,
 EUGENE F. JANE.